Oct. 28, 1969 G. MATTKA 3,475,018

SHEET FOLDING MACHINE

Filed July 3, 1967 8 Sheets-Sheet 1

INVENTOR
Günter MATTKA

Lowry & Rinehart
ATTYS

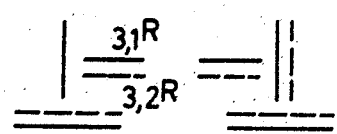
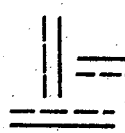
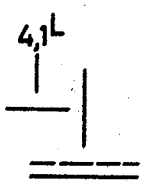
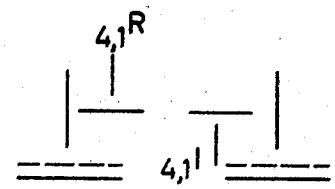
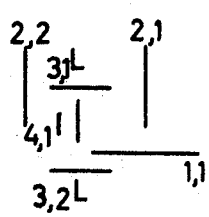
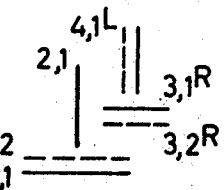

Oct. 28, 1969  G. MATTKA  3,475,018
SHEET FOLDING MACHINE

Filed July 3, 1967  8 Sheets-Sheet 3

INVENTOR
Günter MATTKA

Lowry & Rinehart
ATTYS.

Oct. 28, 1969  G. MATTKA  3,475,018
SHEET FOLDING MACHINE
Filed July 3, 1967  8 Sheets-Sheet 4

INVENTOR
Günter MATTKA

Lowry & Rinehart
ATTYS.

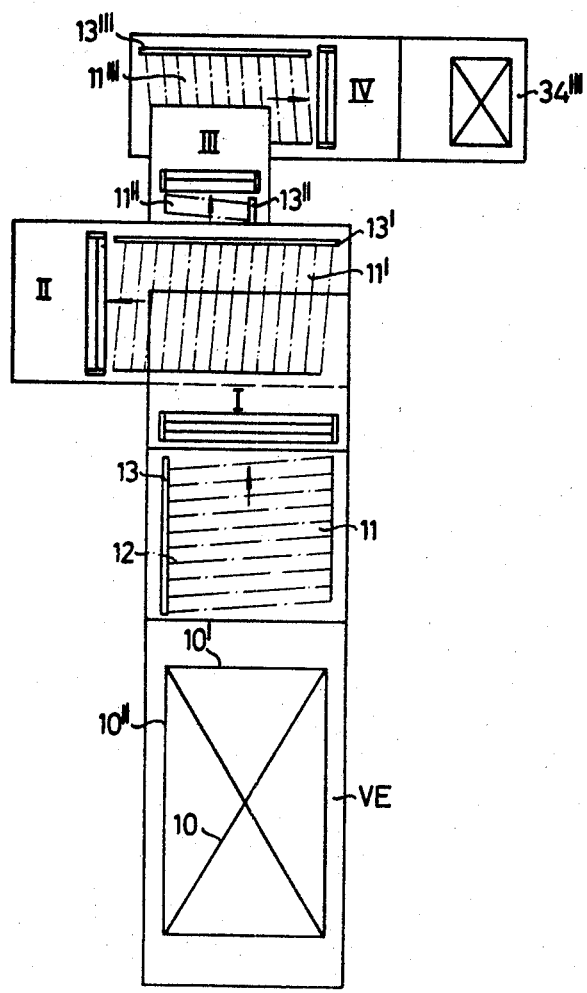

FIG.35 FIG.36 FIG.37 FIG.38
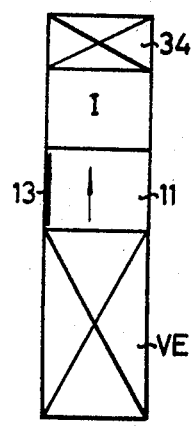
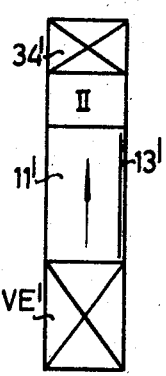
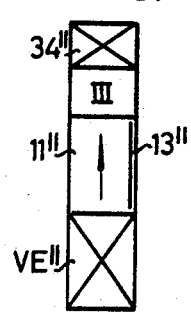
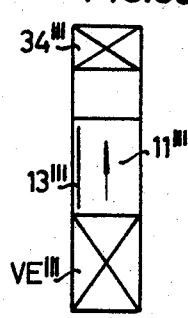
FIG.39 FIG.40 FIG.41
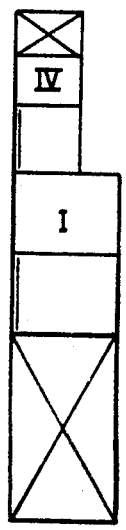
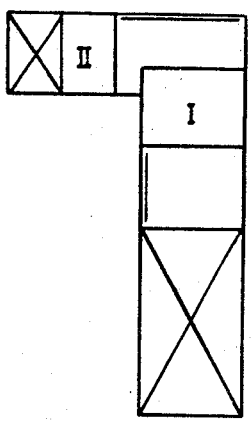
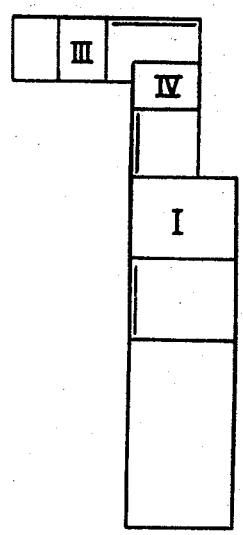
INVENTOR
Günter MATTKA
Lowry & Rinehart
ATTYS.

Oct. 28, 1969   G. MATTKA   3,475,018
SHEET FOLDING MACHINE
Filed July 3, 1967   8 Sheets-Sheet 8

INVENTOR
Günter MATTKA

Lowry & Rinehart
ATTYS.

United States Patent Office 3,475,018
Patented Oct. 28, 1969

3,475,018
SHEET FOLDING MACHINE
Günter Mattka, 9 Heidestrasse, Brackwede, Germany
Filed July 3, 1967, Ser. No. 650,698
Claims priority, application Germany, July 1, 1966,
M 70,070
Int. Cl. B65h 45/18
U.S. Cl. 270—67        9 Claims

ABSTRACT OF THE DISCLOSURE

A portable sheet folding machine is provided which is capable of association with other similar machines in various combinations to effect different folding patterns. The machine includes an input conveyor, a folding unit, a delivery means, and means to adjust the vertical height of the machine so that its delivery means may be aligned, with the input of another machine.

BACKGROUND OF THE INVENTION

This invention relates to sheet folding machines, and more specifically to a sheet folding machine having one or more knife folding units, each folding unit including a sheet register scale adjustable both in the sheet feed direction and in the opposite direction, a sheet feed device, and an individual drive and being adapted to be combined with further folding units selectively in parallel or angularly displaced relationship on different levels.

Sheet folding machines for the manufacture of books, booklets, brochures, pamphlets and the like are known in the art in a variety of designs which mainly differ from one another in the number and arrangement of their folding units. To meet the most different requirements in practice, machines are required that enable a plurality of the most different folding combinations to be realized.

Buckle folding machines, knife folding machines and combined buckle and knife folding machines, which have hitherto been used for doing the above-mentioned kinds of work, differ from one another not only in design, but also in the possibilities of application and in performance. Multifold buckle folding machines offer the most complete gamut of different folding combinations to be found in a single machine and are at the same time the most efficient machines. On the other hand, however, only a limited gamut of paper grades can be processed by them. Very thin and unstable papers, as well as very stiff papers, i.e. cardboard-like papers, cannot be processed by them. In these machines, the paper grade, the type and execution of print as well as the room climate have a considerable bearing on the folding quality and on the performance. A buckle folding machine makes high demands on the technical knowledge of the operating personnel.

The smallest choice of different folding combinations in one and the same machine is offered by the pure knife folding machine. At the same time it is also the slowest construction of the above-mentioned three systems. This is due, on the one hand, to the fact that in the conventional knife folding units the feed direction of the sheets extends parallel to the knife and thus parallel to the fold to be produced. Consequently, the following sheet can move into the folding unit concerned only after the first sheet has left the folding unit completely. Therefore, a relatively large spacing between the individual sheets is required. Since the moving speed of the paper is limited, on the one hand, by its stiffness and, on the other hand, by the desired quality of the fold, the output capacity is reduced by the described feeding conditions. Furthermore, the sheet fed into the knife folding unit and arrested by the front register scale has to be additionally laterally aligned by means of the so-called pull or push marks. Such alignment can be effected only after a sheet, which has abruptly been arrested by the front register scale and thus has been caused to rebound, has come to rest again against the front stop. This is another cause for a reduced sheet succession, i.e. a reduced output. However, the knife folding machine can process the largest gamut of different paper grades and it provides the most accurate folds and is the most insensitive on influences originating from the paper, from the pressure or from the climate. Also, the knife folding machine makes the least demands on the technical skill of the operating personnel.

The combined buckle and knife folding machine is an exact intermediate between the two aforedescribed designs, which is quite obvious. According to the foregoing, consequently, pure knife folding machines are the most reliable, the most insensitive and the simplest folding machines. The combined buckle and knife folding machines range second in this respect and stand out for their greater versatility. These two types make the lowest demands on the technical skill and circumspection of the personnel. In keeping with modern conditions, consequently, these machines ought to be preferred under greatly varying working conditions.

Pure knife folding machines are chiefly used in the manufacture of books, whereas combined buckle and knife folding machines are used for books as well as for brochures and advertising leaflets. To meet substantially the different requirements, numerous types of knife and combined buckle and knife folding machines have been developed by the industry. These machines comprise a minimum of one and a maximum of six folding units and are naturally the more expensive, complicated, difficult to operate and susceptible to trouble the larger a number of folding units they comprise. In spite of these disadvantages the most complicated and expensive of these known machines actually include only six of the twenty-five most current designs. What is common to all these constructions is that they cannot be changed by the customer and that subsequently they can be enlarged into high quality constructions only at considerable expenditure. In order to meet, at present and in the near future, to some extent the requirements most current in practice with regard to the manufacture of both books and advertising printed matter, one ought to have a machine which would be required to comprise seven folding units with a total of fourteen folding mechanisms and thus would include all of the twenty-five current designs. The four folding mechanisms in the first folding unit and the three folding mechanisms in the second folding unit enable such a machine to meet all the normal requirements for advertising prints. The two folding mechanisms in each of the third cross fold units enable small two times 16-page-products (e.g. pocket almanacs) to be processed. The three fourth cross fold units, finally, enable the processing of 32-page book prints to be effected according to the German, British and international fourth cross fold system.

Since in most cases in which a folding machine is purchased it is not exactly known what combinations will really be required in future, one would have to buy, in theory, a machine of the latter type. Such a machine, however, will hardly ever be built because it would be inefficient and inattractive for many reasons. There is no factory that would use all of the 25 systems alternately. In each factory only a larger or smaller number of the illustrated systems will be used. The mere mechanical expenditure for a machine of the latter type is so huge that its price would be out of all proportion to its actual use. Notwithstanding the most compact construction, very much floorspace would be required; the machine would be difficult to operate, inaccessible and would require excessive set-up and servicing times and thus excessive costs. If one of its fourteen folding mechanisms were damaged the whole machine would have to be shut down. Downtimes would run high, as would the repair costs. The large number of folding units would also require a large number of adjusting devices, whereby the sources of trouble would be increased accordingly. The folding units not used for a certain work could be switched off, it is true, but would remain in their positions in the machine and thus might possibly be in the way of the operating personnel. It is quite possible that only the first folder is required for an advertising print; the remaining six folders with a total of ten folding units, in this case, would take precious space without doing any productive work, would possibly get dusty and, if necessary, would have to be thoroughly cleaned before they could be used again.

SUMMARY OF THE INVENTION

It is the object of the present invention to eliminate the disadvantages of these prior art machines and to provide a sheet folding machine which, although of the simplest design, is capable of meeting the most diverse requirements and adapted to be easily enlarged or modified, and in which the individual folding units can be combined at will with one another or with known machines, respectively, and each folding unit can always be assigned to productive work.

To attain this object the present invention provides a sheet folding machine of the initially specified type, which is characterized in that the sheet feed device is simultaneously constructed as a sheet aligning device which, with respect to the sheet feed direction, is located upstream of the knife folding unit so that the sheet feed direction extends transversely to the substantially vertical plane of movement of the folding knife. Owing to the fact that the sheets are fed at right angles to the folding knife by means of the feeding device comprising, for example, obliquely arranged conveying rollers or roller ends, obliquely moving conveyor belts or aprons, normally running conveyor belts with obliquely arranged feed rollers or means adapted to align the sheets pneumatically, the sheets will be laterally aligned and fed to the knife folding unit at the same time and without any interruption of the feed movement. In this manner the sheet is already completely aligned at the moment it enters the knife folding unit. The sheet is merely arrested by the front register scale with which it is in perfect parallel alignment already. Immediately after that the knife can operate and effect the folding. The stoppage time of the sheet is thus reduced to a fraction of the time that was hitherto involved. Moreover, the end of the sheet folded down by the folding knife is fed off in the same direction in which the following sheet is supplied. Consequently, the second sheet can directly follow the first sheet, i.e. a practically continuous sheet supply is achieved. This feature alone is practically sufficient to increase the output of the machine by 25 to 30% without increasing the sheet feed speed. By feeding the sheets via slant transport tracks an overlapped sheet feed is rendered possible in the case of cross folding, i.e. if the respective folding unit is angularly displaced by 90° relative to the preceding folding unit. With major sheet sizes this enables a further 10 to 15% increase of the output to be achieved. Due to the fact that the incoming sheet abuts against the front register scale in perfect alignment, i.e. with its leading edge perfectly parallel thereto, all the stop points of this front register scale are always reached at the same instant so that buckling of the leading edge of the sheet at individual stop points is obviated. It is also possible, at the same time, to provide in any case the maximum number of stop points so that the total buckling of the sheet is reduced too.

This results in a better fold quality at the same sheet feed speed, which is due to reduced buckling. Feeding the sheets via a slant transport track enables the folding unit to be arranged selectively either parallel or at right angles to preceding folding units or other machines supplying the sheets. Thus the following fold may be effected parallel or at right angles to the run-out direction (with respect to the preceding folding unit or another machine). This enables a multiplication of single-set and combination work to be achieved. The folding units may be joined together in any sequence either parallel or at right angles, it being merely required to suitably adjust the levels to one another. Consequently, a few manipulations are sufficient to fit up the optimum machine combination for the work actually to be done, which combination need no longer include a folding unit which is not used in the actual production. If any of the folding units provided are not used for a certain work, these units may also be assigned to productive work in other places, i.e. as independent folding machines, in that known sheet singling devices and known sheet collecting devices (delivery boxes) are inserted respectively upstream and downstream of these folding units. The adjustable working level permits individual folding units also to be attached to known sheet processing machines (folding machines, perforators, printing machines and the like). The combination of a plurality of these folding units to a multifold machine results in a simple, clear and accessible arangement which can be set up and serviced at minimum expenditure. In the case of mechanical damage to a folding unit operation can be continued all the same with the other units after having removed the damaged one. The damaged folding unit can easily and rapidly be repaired because it is freely get-at-able from all sides. Hence downtimes and repair times and thus cost are reduced to a minimum. The manufacturing time and cost for such machines may also be reduced because such folding units of any required size can be built with many similar and a few changeable parts.

In an advantageous embodiment of the invention a pair of folding rolls is provided, the two rolls of which are mounted for rotation in opposite directions in a common horizontal plane, and a conveyor operable in the direction of the sheet register scale is arranged between this latter and the pair of folding rolls. Compared with a stationary slide track, which would be sufficient for heavy and stiff paper grades, this arrangement is particularly suitable for light and unstable papers of major sheet sizes because in this manner the feed speed of the sheets can be kept substantially constant up to the sheet register scale.

In further developing this embodiment of the invention it may prove expedient to arrange a sheet distributing guide under the pair of folding rolls. This enables the sheets to be delivered in two different directions.

Another development of this embodiment of the invention may consist in that a sheet conveyor adapted to deliver the sheets towards the interior or the exterior of the machine, respectively, is arranged on both sides of the sheet distributing guide and below thereof. The advantage of this arrangement consists also in the fact that light and unstable papers of major sheet sizes are safely delivered and, if required, fed to a further processing station.

The aforedescribed embodiment of the invention may be supplemented, moreover, by a pair of knife shafts inserted between the pair of folding rolls and the sheet distributing guide. This arrangement offers the advantage of grooving, perforating or cutting the sheets subsequent to folding.

An advantageous development of the invention consists, furthermore, in that a further folding roll and a folding plate are located downstream of the pair of folding rolls. In this manner the range of application of the machine proposed by the invention can be increased to a considerable extent. This feature of the invention may be supplemented by a pair of knife shafts disposed downstream of the folding plate. This enables further operations to be effected, as already mentioned. Finally, depending on the particular operating conditions, it may be advisable to construct the sheet delivery device at the end of the machine as a conveyor.

BRIEF DESCRIPTION OF THE DRAWINGS

FIGS. 1 to 27 are different folding patterns;

FIG. 33 is a top plan view of a four-fold sheet folding machine according to the invention and corresponding to the pattern of FIG. 27;

FIG. 35 is a top plan view of the folding unit I of FIG. 33, arranged for use as an independent machine;

FIG. 36 is a top plan view of the folding unit II of FIG. 33, arranged for use as an independent machine;

FIG. 37 is a top plan view of the folding unit III of FIG. 33, arranged for use as an independent machine;

FIG. 38 is a top plan view of the folding unit IV of FIG. 33, arranged for use an an independent machine;

FIG. 39 is a top plan view of a combination of the folding units I and IV of FIG. 33, the folding unit IV being connected in parallel behind the folding unit I;

FIG. 40 is a top plan view of a combination of the folding units I and II of FIG. 33, illustrated in cross fold arrangement;

FIG. 41 is a top plan view of a combination of the folding units I, IV and III of FIG. 33 in cross fold arrangement, with the folding unit IV being connected in parallel behind the folding unit I and the folding unit III as a cross folding unit being placed behind the folding unit IV, with respect to the sheet feed direction;

DESCRIPTION OF THE PREFERRED EMBODIMENTS

FIGS. 1 to 27 show different folding patterns.

Figure 1:
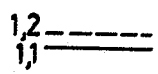
Figure 2:
Figure 3:
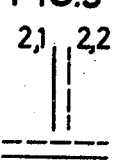
Figure 4:
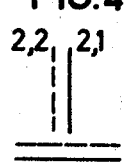
Figure 5:
Figure 6:
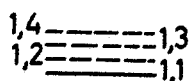
Figure 7:
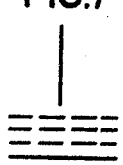
Figure 8:
Figure 9:
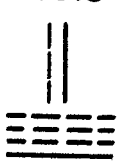
Figure 10:
Figure 11:
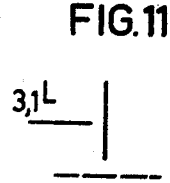
Figure 12:
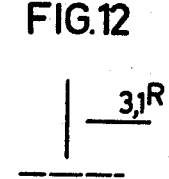
Figure 13:
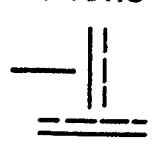
Figure 14:
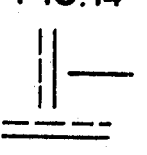
Figure 15:
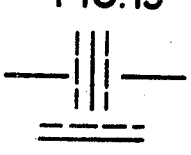
Figure 16:
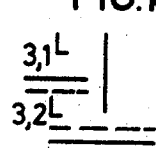
Figure 28:
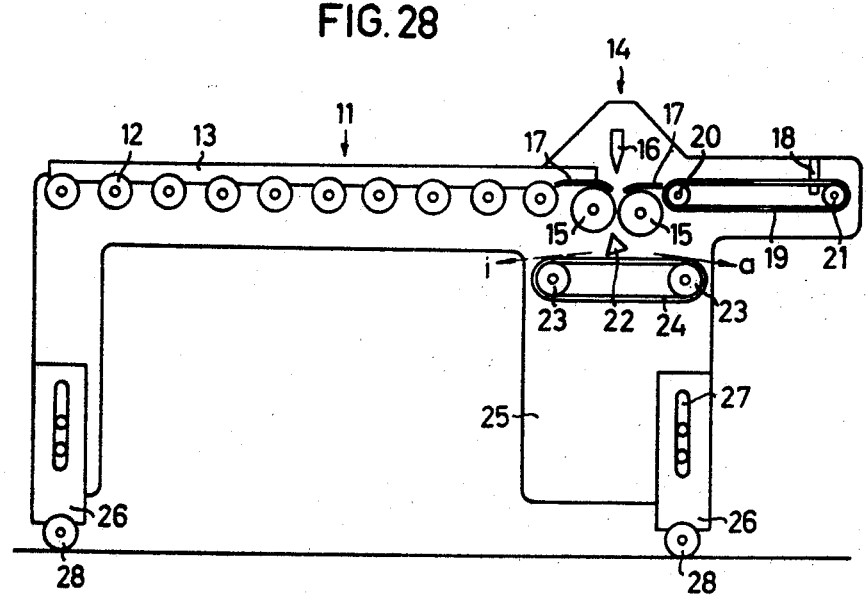
FIG. 28 is a side elevational view of a knife folding unit according to the invention, including a sheet feed device represented as a skew roller table.
Figure 29:
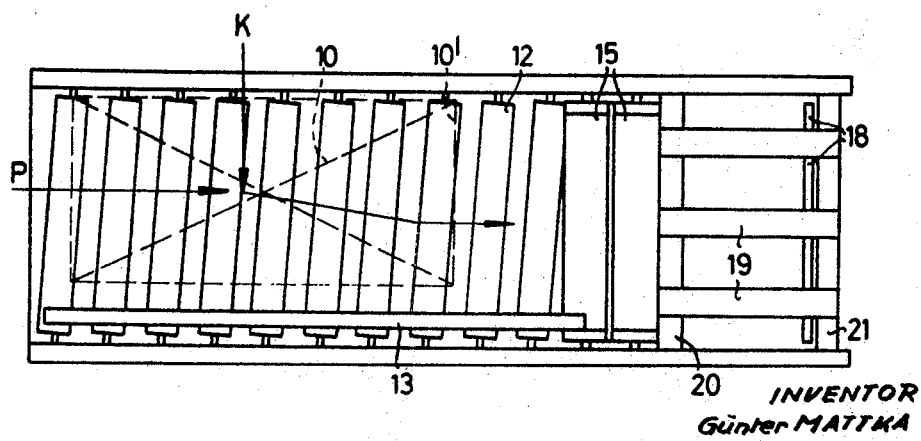
FIG. 29 is a top plan view of the knife folding unit of FIG. 28, the feed device being illustrated with right-hand abutment.
Figure 30:
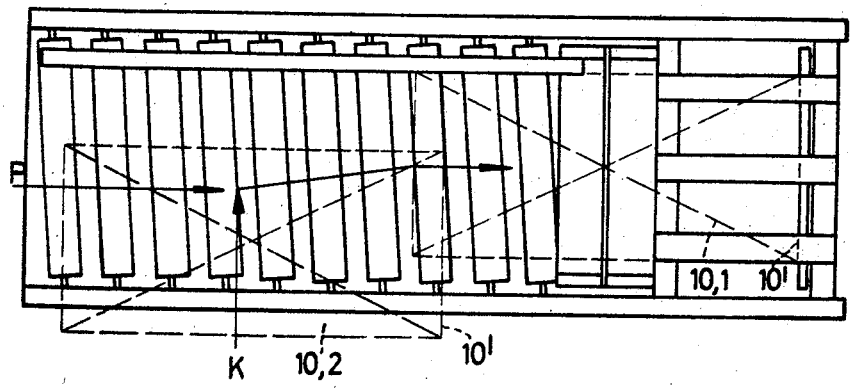
FIG. 30 is a top plan view of the knife folding unit of FIG. 28, the feed device being shown with left-hand abutment.

Referring to FIGS. 28 to 30, a sheet 10 coming from a preceding sheet singling device or a preceding folding unit or another sheet processing machine, respectively, may be fed in the direction P (for parallel folding) or in the direction K (for cross folding) on to a transport track or conveyor 11. With the aid of transport rollers 12, arranged askew to the general feed direction the sheet 10 will be fed to a knife folding unit 14 while being aligned, at the same time, by a straightedge 13. The sheet 10 then will pass, assisted by guide plates 17, between a pair of folding rolls 15 and a folding knife 16 of the knife folding unit 14 until its leading edge 10' encounters a sheet register scale 18 interrupting, for the time being, the feed of the sheet 10. Normally, the feed of the sheet 10 is effected solely by the transport track or conveyor 11. However, in machines handling large sheet sizes the feed of the sheet in the region extending between the folding unit 14 and the sheet register scale 18 may conveniently be assisted by conveying means, such as conveyor belts 19 passing over driven drums or rollers 20 and 21. When the leading edge 10' of the sheet 10 abuts against the sheet register scale 18 the folding knife 16 is moved vertically downwards by mechanical, electrical, pneumatic or hydraulic drive means actuated by mechanical, electrical or pneumatic contactors. In this manner the sheet 10 is folded down between the pair of counterrotating folding rolls 15, gripped thereby, folded, and fed on vertically downwards.

Below the folding rolls 15 a sheet distributing guide 22 is mounted for guiding the sheet 10 either to the outer outlet *a* or the inner outlet *i* of the folding unit 14. Feeding the sheet 10 out of the folding unit 14 may be effected by means of transport rollers 23 alone or assisted by additional conveyor belts 24. To the respective outlet *a* or *i* of the knife folding unit 14 either a further folding unit or a sheet collecting device (sheet deliverer) may be connected in series. All the parts required for the feed device 11, the knife folding unit 14, the sheet register scales 18, as well as the transport rollers and conveyor belts 21 to 24 and the associated drive and control means are indirectly or directly secured to walls 25 of the machine and combined to form a unit. Also secured to these walls 25 of the machine, but so as to be vertically adjustable, are legs 26. The vertical adjustment of the legs 26 may be effected by means of pneumatic or hydraulic devices (not shown). To facilitate the locomotion of the folding unit, the legs 26 may be provided with casters or balls 28.

Figure 31:
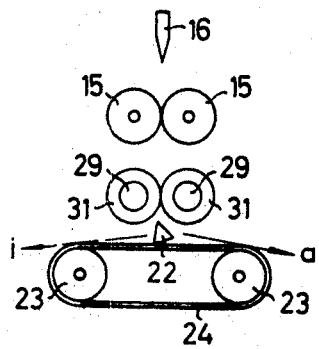
FIG. 31 shows a detail of FIG. 28 with a pair of knife shafts for receiving cutting or grooving means being connected behind the pair of folding rolls of the knife folding unit.

As shown in FIG. 31, a pair of knife shafts 29 adapted to receive devices 31 for perforating, cutting or grooving the folded sheets may be arranged vretically below the pair of folding rolls 15, thereby to increase the operational versatility of the folding unit 14.

Figure 32:
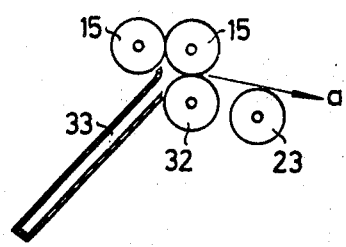
FIG. 32 shows a detail of FIG. 28, with a further folding roll and folding plates being arranged, with respect to the sheet transport direction, downstream of the pair of folding rolls of the knife folding unit.

Another integration of the folding unit 14 is possible by arranging an additional folding roll 32 and folding plates 33 vertically below the pair of folding rolls 15, as shown in FIG. 32. This enables a second fold to be produced which extends parallel to the first fold produced by the folding knife 16 and the pair of folding rolls 15. Subsequently, the sheet may be fed directly or by means of a transport roller 23 to the outlet *a* of the folding unit.

The combination shown in FIG. 33 forms a fourth cross fold machine which, without having to be converted, enables a 32-page folding to be effected accordnig to the German and international imposition systems. To achieve this end, four folding units I, II, III and IV are combined and alternately offset by 90° relative to one another. The folding unit II is expediently provided with the pair of knife shafts 29 shown in FIG. 31, whereas the folding units III and IV are each provided with additional folding plates 33, as shown in FIG. 32. This arrangement enables all the different kinds of work to be done for which normally machines of the types illustrated in FIGS. 1 to 25 are used. For a German fourth cross fold, which requires a machine of the FIG. 22 type, the sequence of operations in the combination of FIG. 33 is the following:

From a sheet singling device VE the sheet 10 is fed via the transport track or conveyor 11, exactly aligned by the straightedge 13, into the folding unit I. The folding unit I may be a knife folding unit of the type proposed by the invention or a plate folding unit of a known type.

In its centre the sheet 10 is folded once parallel to its leading edge 10' and delivered onto a transport track 11'. The transport track 11' on which the sheet 10 is aligned by a straightedge 13', feeds the sheet 10 into the folding unit II which embodies the invention as illustrated in FIG. 31. In the folding unit II the sheet 10 is provided with a second fold which extends at right angles to the first fold and parallel to a lateral edge 10" of the sheet 10. Through the inner outlet *i* of the folding unit II the sheet passes onto a transport track 11" by which it is fed, while being aligned by a straightedge 13", into the folding unit III. In the folding unit III, which is constructed in accordance with the invention as illustrated in FIG. 31, the sheet 10 is provided with a third fold extending at right angles to the second fold and thus parallel again to the leading edge 10' of the sheet 10. This third fold is produced by the folding knife 16 and the pair of folding rolls 15. The folding plates 33 are closed by a sheet distributing guide (not shown) so that the folded sheet is directly fed to the outer outlet *a* of the folding unit III via the folding roll 32. The sheet then gets onto the transport track 11'" by which it is fed, while being aligned by a straightedge 13'", into the folding unit IV constructed according to the FIG. 32 embodiment of the invention. In this unit, too, the folding operation is effected by the folding knife 16 and a pair of folding rolls 15. The folding plates 33 are likewise closed by a sheet distributing guide (not shown), and the sheet is fed via the folding roll 32 to the outer outlet *a* of the folding unit IV. Associated with the outlet *a* is a sheet collecting device (sheet deliverer) 34'" on which the folded sheets are collected and piled.

For producing 32-page international fourth cross fold work it is only required to open the folding plates 33 in the folding unit III to make it ready for operation and to shift the sheet register scale 18 up to the folding knife 16. In this manner it is ensured that the edge of the sheet abutting against the sheet register scale 18 is knocked down by the folding knife 16 and directly inserted between the pair of folding rolls 15. Consequently, no folding operation is effected in this instance. The pair of folding rolls 15 feed the sheet into the folding plates 33 where its leading edge encounters an adjustable sheet register scale (not shown), whereby a buckle folding operation is caused to be effected between the pair of folding rolls 15 and the folding roll 32, the resulting fold extending at right angles to the fold produced in the folding unit II but having an orientation opposite to the one it would have if it had been produced by the folding knife 16 of the folding unit III. In the folding unit IV, the folding operation is effected by means of the folding knife 16.

Figure 34:
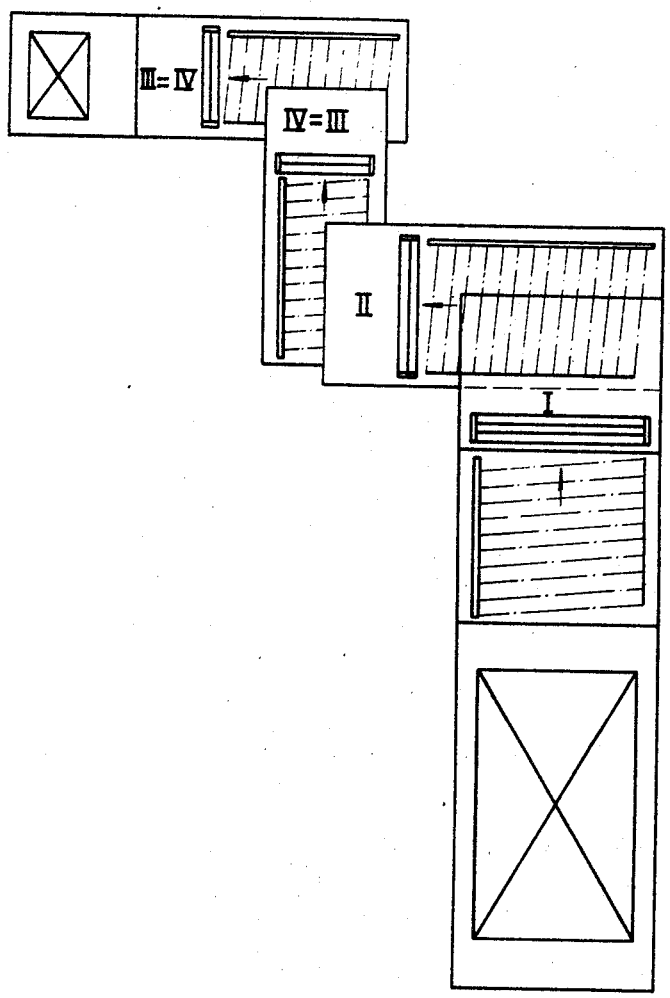
FIG. 34 is a four-fold sheet folding machine of the type illustrated in FIG. 33, but converted to other fold-in combinations.
Figure 42:
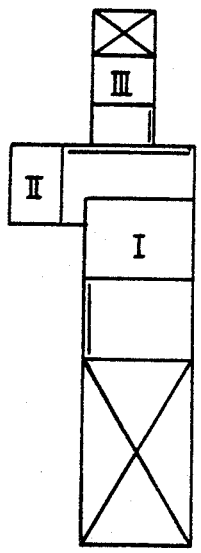
FIG. 42 is a top plan view of a combination of the folding units I, II and III of FIG. 33 in three-fold arrangement for standard type 16-page folding work.
Figure 43:
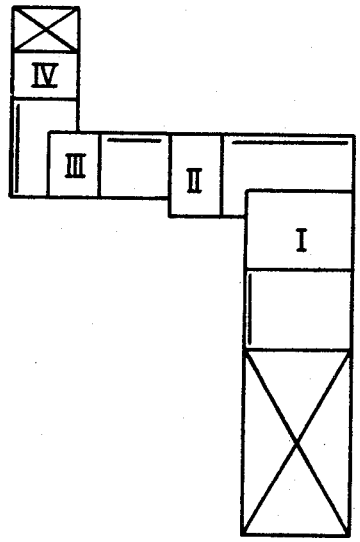
FIG. 43 is a top plan view of another combination of the folding units I to IV of FIG. 33 in three-fold arrangement, the folding unit III being connected in parallel behind the folding unit II and the folding unit IV as a three-fold unit being placed behind the folding unit III, with respect to the sheet feed direction.

In FIG. 34 a machine of the type illustrated in FIG. 33 is arranged for other combinations. More particularly, the folding unit IV of FIG. 33 is arranged as folding unit III downstream of the folding unit II, with respect to the sheet feed direction, and the folding unit III of FIG. 33 is used as folding unit IV. This arrangement enables British fourth cross fold work to be produced by using in the folding units III and IV the respective folding knives 16 for producing the folds, whereas the folding plates 33 are closed by the aforementioned sheet distributing guides.

Figure 44:
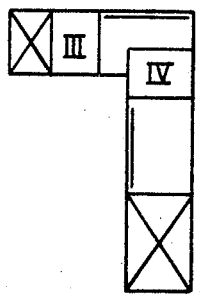
FIG. 44 is a top plan view of the folding units IV and III of FIG. 33 in cross-fold arrangement as an independent two-fold machine.

FIGS. 35 to 44 are schematic top plan views showing further combinations of the folding units I to IV of FIG. 33. In each of the arrangements shown in FIGS. 35 to 38 the folding units I to IV are used respectively as independent machines for parallel cross folds. This requires the folding units II to IV to be provided with additional sheet feeders VE', VE" and VE'", respectively, which may be hand feeders or semi or fully automatic feeders, as well as with additional sheet deliverers 34', 34" and 34'", respectively. In FIG. 44 the folding units IV and III are illustrated as independent combinations for crossfolds. This arrangement requires also an additional sheet feeder and an additional sheet deliverer because the sheet feeders and deliverers of the standard equipment are used on the main machine formed by the folding units I and II of FIG. 40. Besides the aforementioned additional sheet feeders and sheet deliverers for the independent use of the folding units II and IV no further devices are required for providing the FIGS. 35 to 44 combinations of the knife folding units proposed by the invention.

A machine of the type illustrated in FIG. 33, which is formed of knife folding units constructed in accordance with the invention, thus is a simple, clearly arranged and easily get-at-able combination which for optimal adaptation to the actual working conditions in each specific case can be converted at any time without difficulty by the user himself to enable at least 25 conventional folding combinations to be obtained, which means that it practically replaces 25 different conventional folding machines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:
1. A sheet folding machine comprising in combination:
 (a) means mounting at least one folding unit on a frame structure,
 (b) a conveying means to move a sheet in a substantially horizontal direction to said folding unit,
 (c) said folding unit having a folding knife movable in a substantially vertical plane and a cooperating means located below said folding knife to receive a sheet which has been acted upon by the knife,
 (c) said frame structure including means to adjust the frame structure in a vertical direction and means to easily move said folding machine, said frame structure having an open construction to effect a combination of said folding machine with further folding machines at different levels in at least one relationship wherein said machines are in an angularly displaced relationship and wherein said machines are in a parallel relationship,
 (e) means fixedly mounted to said frame structure located below said folding unit to deliver a folded sheet from said folding machine to another folding machine,
 (f) means mounting a sheet register scale on said frame structure, said register scale being adjustable in the sheet feed direction and in a direction opposite thereto,
 (g) said conveying means including a sheet aligning device located ahead of said folding unit to extend the sheet feed direction transversely to the substantially vertical plane of movement of said golding knife, and
 (h) an individual drive means for each folding unit.
2. A machine as defined in claim 1 wherein said cooperating means includes a pair of folding rolls which are mounted for rotation in opposite directions in a common plane below said folding knife and the conveying means include a conveyor operable in the direction of the sheet register scale mounted between said register scale and the said pair of folding rolls.
3. A machine as defined in claim 2 wherein said folding unit includes a sheet distributing guide mounted below the pair of folding rolls.
4. A machine as defined in claim 3 wherein said fixedly mounted delivery means includes sheet conveyor means to deliver the sheets toward the interior of the machine,
said sheet conveyor means being mounted below and on both sides of the sheet distributing guide.
5. A machine is defined in claim 3 wherein said fixedly mounted delivery means includes sheet conveyor means to deliver the sheets toward the exterior of the machine, said sheet conveyor means being mounted below and on both sides of the sheet distributing guide.

6. A machine as defined in claim 3 wherein
said folding unit includes a pair of knive shafts mounted between the pair of folding rolls and the sheet distributing guide.

7. A machine as defined in claim 2 wherein
said folding unit includes a further folding roll and folding plates mounted on said frame member and located downstream of the pair of folding rolls.

8. A machine as defined in claim 7 wherein
a pair of knife shafts is mounted on said frame member and located downstream of the said further folding roll and the folding plates.

9. A machine as defined in claim 6 wherein
said fixedly mounted delivery means includes a conveyor means having a sheet delivery device located downstream of said sheet distributing guide at the end of the machine.

References Cited

UNITED STATES PATENTS

| | | | |
|---|---|---|---|
| 689,862 | 12/1901 | Eckerson | 270—82 |
| 795,519 | 7/1905 | Lang et al. | 270—62 |
| 840,470 | 1/1907 | Brannan | 270—81 |
| 1,535,216 | 4/1925 | Ehlig | 270—80 |
| 2,848,219 | 8/1958 | Beck | 270—68 |
| 3,206,191 | 9/1965 | Hantscho | 270—85 |

FOREIGN PATENTS

| | | |
|---|---|---|
| 475,992 | 11/1937 | Great Britain. |
| 524,643 | 5/1931 | Germany. |

EUGENE R. CAPOZIO, Primary Examiner

P. V. WILLIAMS, Assistant Examiner

U.S. Cl. X.R.

270—84